United States Patent
Wang et al.

(10) Patent No.: US 11,888,978 B1
(45) Date of Patent: Jan. 30, 2024

(54) SYSTEMS AND METHODS FOR MEASUREMENT-DEVICE-INDEPENDENT QUANTUM KEY DISTRIBUTION

(71) Applicant: CABLE TELEVISION LABORATORIES, INC., Louisville, CO (US)

(72) Inventors: Jing Wang, Broomfield, CO (US); Bernardo Huberman, Palo Alto, CA (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 285 days.

(21) Appl. No.: 17/342,151

(22) Filed: Jun. 8, 2021

Related U.S. Application Data

(60) Provisional application No. 63/055,493, filed on Jul. 23, 2020, provisional application No. 63/036,015, filed on Jun. 8, 2020.

(51) Int. Cl.

| | |
|---|---|
| *H04L 9/08* | (2006.01) |
| *G06N 10/00* | (2022.01) |
| *H04B 10/85* | (2013.01) |
| *G06F 1/10* | (2006.01) |
| *H04J 14/02* | (2006.01) |

(52) U.S. Cl.
CPC ............ *H04L 9/0852* (2013.01); *G06F 1/105* (2013.01); *G06N 10/00* (2019.01); *H04B 10/85* (2013.01); *H04J 14/02* (2013.01); *H04L 9/0819* (2013.01)

(58) Field of Classification Search
CPC ...... H04L 9/0852; H04L 9/0819; G06F 1/105; G06N 10/00; H04B 10/85; H04J 14/02
See application file for complete search history.

(56) References Cited

U.S. PATENT DOCUMENTS

| 10,540,146 B1 * | 1/2020 | Vakili ............... G01J 3/45 |
| 63,055,493 | 7/2020 | Wang |

(Continued)

OTHER PUBLICATIONS

Gisin, Nicolas, et al., Quantum cryptography, Review of Modern Physics, vol. 74, Jan. 2002 (Year: 2002).

(Continued)

*Primary Examiner* — Mohammad W Reza
(74) *Attorney, Agent, or Firm* — COZEN O'CONNOR

(57) ABSTRACT

A measurement-device-independent quantum key distribution (MDI-QKD) network includes a plurality of user nodes connected to untrusted relay node that performs Bell-state measurements on qubits transmitted by the user nodes. The relay node contains a calibration laser that serves as a wavelength reference for the user nodes. The output of the calibration laser is split into two wavelength-calibration signals, which are transmitted to a pair of user nodes via optical fiber. At each user node, a laser diode used to generate weak coherent pulses is injection-locked with the wavelength calibration-signal, thereby ensuring that the user nodes generate photonic qubits with the same wavelength. The embodiments may be implemented with any encoding scheme compatible with MDI-QKD, such as polarization encoding and time-bin phase-encoding. No auxiliary connections between the user nodes are needed, allowing the MDI-QKD network to be scaled up to many users.

27 Claims, 11 Drawing Sheets

(56) References Cited

U.S. PATENT DOCUMENTS

| | | | | |
|---|---|---|---|---|
| 11,536,897 | B1* | 12/2022 | Thompson | G02B 6/4274 |
| 2013/0308956 | A1* | 11/2013 | Meyers | G06N 10/00 |
| | | | | 977/933 |
| 2016/0352515 | A1* | 12/2016 | Bunandar | H04L 9/0852 |
| 2020/0274703 | A1* | 8/2020 | Lukens | H04L 9/0858 |
| 2022/0400001 | A1* | 12/2022 | Catuogno | H04L 9/0819 |

OTHER PUBLICATIONS

Gottesman, Daniel, et al., Security of Quantum Key Distribution with Imperfect Devices, Quantum Information and Computation, vol. 4, No. 5 (2004); 325-360 (Year: 2004).

Liu, Yang, et al., Experimental measurement-device-independent quantum key distribution, Shanghai Branch, Hefei National Laboratory for Physical Sciences at Microscale and Department of Modern Physics, University of Science and Technology of China, Sep. 27, 2012 (Year: 2012).

Lo, Hoi-Kwong, et al., Measurement device independent quantum key distribution, Department of Physics & Department of Electrical and Computer Engineering, University of Toronto, May 28, 2012 (Year: 2012).

Tang, Yan-Lin, et al., Field Test of Measurement-Device-Independent Quantum Key Distribution, IEEE Journal of Selected Topics in Quantum Electronics, vol. 21, No. 3, May/Jun. 2015 (Year: 2015).

Tang, Yan-Lin, et al., Measurement-device-independent quantum key distribution over 200 km., Department of Modern Physics and national Laboratory for Sciences at Microscale, Shanghai Branch, University of Science and Technology of China, Jul. 30, 2014 (Year: 2014).

Tang, Yan-Lin, et al., Shanghai Branch, National Laboratory for Physical Sciences at Microscale and Department of Modern Physics, University of Science and Technology of China, Sep. 30, 2015 (Year: 2015).

Tang, Zhiyuan, et al., Experimental Demonstration of Polarization Encoding Measurement-Device-Independent Quantum Key Distribution, Centre for Quantum Information and Quantum Control, Department of Physics & Department of Electrical and Computer Engineering, University of Toronto, Jul. 24, 2013 (Year: 2013).

Zhang, Qiang, et al., Large scale quantum key distribution: challenges and solutions, Optics Express, vol. 26, No. 18, Sep. 3, 2018 (Year: 2018).

* cited by examiner

— Auxiliary
- - - Classical
— Quantum

SYSTEMS AND METHODS FOR MEASUREMENT-DEVICE-INDEPENDENT QUANTUM KEY DISTRIBUTION

RELATED APPLICATIONS

This application claims priority to U.S. Provisional Patent Application No. 63/036,015, titled "Scalable Polarization-Encoding Measurement-Device-Independent Quantum Key Distribution Network" and filed Jun. 8, 2020, and to U.S. Provisional Patent Application No. 63/055,493, titled "Scalable Time-Bin Phase Encoding Measurement-Device-Independent Quantum Key Distribution Network" and filed Jul. 23, 2020. Each of these applications is incorporated herein by reference in its entirety.

BACKGROUND

In modern communications, access networks, both optical and wireless, are the most vulnerable segments of data security. Most eavesdropping takes place in access networks due to tree or star topologies where downstream data is broadcast to all users. An unintended user can easily probe a neighbors' downstream traffic without being noticed, get their MAC addresses and logic link identifications, and infer traffic type and amount. For example, in a passive optical network, the downstream multiple-point-control protocol message is broadcast to all users and reveals the upstream traffic characteristics of each user. Even worse, an eavesdropper can access the upstream data traffic of its neighbors via a reflection in the network. The situation in wireless access networks is worse since the air interface is open to the public.

Cryptography is widely used in modern communication to protect three aspects of data security: confidentiality, integrity, and authentication. Confidentiality prevents the content of a message from being accessed by unintended recipients. Integrity protects a message from being modified during transmission. Authentication prevents spoofing attacks by verifying the identities of communication parties. All three aspects are protected by the data encryption.

Modern cryptographic systems can be divided into two categories: symmetric and asymmetric. Asymmetric cryptography, also known as public cryptography, uses public and private keys for encryption, signature, and authentication. Symmetric cryptography, however, uses an identical key for the sender and receiver. Since symmetric cryptography has superior performance and is more robust against a quantum-computer attack, it has been widely used in modern communications. The most prevailing symmetric encryption method is the Advanced Encryption Standard. Since the security of a symmetric cryptographic system relies on the secrecy of its keys, key distribution becomes an important job, one which cannot be handled by symmetric cryptography itself. In today's communications, there is no absolutely secure way to deliver keys. Usually, it is handled by asymmetric cryptography in which the security of keys is protected by the computational complexity of intractable mathematical problems. There are several intractable math problems exploited by asymmetric cryptography, such as integer factorization for the RSA algorithm, the discrete logarithm for Diffie-Hellman key exchange, and the elliptic-curve discrete logarithm for elliptic-curve cryptography. Although intractable on classical computers, these problems can be solved in polynomial time on a quantum computer by Shor's algorithm. Accordingly, asymmetric cryptographic systems may be compromised by quantum computers and will therefore no longer be secure. Increasing the key length does not help since the required number of qubits scales linearly with key length.

To address this challenge, quantum key distribution (QKD) is a promising technique for key distribution. Different from asymmetric cryptography, where keys are protected by complex math problems, QKD guarantees the security of keys by quantum mechanics and offers information-theoretic security, i.e., the keys cannot be broken even if an adversary has unlimited computing power. However, the absolute security offered by QKD is only guaranteed for ideal single-photon sources and detectors, which do not yet exist in practice. Such gaps between ideal and realistic devices create security loopholes which can be exploited via side-channel attacks.

In a realistic QKD system, expensive and impractical single-photon sources are replaced by weak coherent pulses (WCP) whose imperfections may become the targets of side-channel attacks. For example, the photon number of a WCP follows a Poisson distribution. There always exist pulses containing more than one photon, which could be exploited by what is known as a photon-number-split attack. For example, if Alice blocks all single-photon pulses and divides all multi-photon pulses, keeping a half for herself and sending the other half to Bob, she will always have an identical copy of keys with Bob. To eliminate this loophole, decoy-state protocols were invented to vary photon number per pulse, so Alice's strategy of different blocking rates of single- and multi-photon pulses will be revealed. Another example is that an ideal single-photon source has random phase for each pulse, but the phase of WCPs is not truly random, which could become the target of an unambiguous-state-discrimination attack. This loophole is eliminated by using directly modulated lasers or phase modulators to actively randomize their phase.

Additional security loopholes originate from imperfect detectors. For example, the time-shift attack exploits the efficiency mismatch between detectors, where Alice steals key information by shifting the qubit arrival time at Bob. The detector blinding attack exploits the after-gate pulses and dead time of avalanche detection of single-photon detectors.

Measurement-device-independent QKD (MDI-QKD) protocols were developed to remove all loopholes at the detection side. In conventional prepare-and-measure QKD protocols, Alice prepares and sends quantum states to Bob, who measures the received states. In MDI-QKD, both Alice and Bob independently prepare random quantum states that they send to Charlie, a third party, for Bell-state measurement (BSM). Charlie publicly announces whether or not a BSM was successful, but reveals no information about what states Alice and Bob sent. Therefore, Charlie serves as an untrusted relay and could even be Alice herself. The post-selection of events of successful BSMs actually entangles the quantum states sent by Alice and Bob, which is why MDI-QKD is equivalent to a time-reversed entangled-photon-pair (EPR) protocol. In key sifting, Alice and Bob keep the data from the events of successful BSMs as raw keys and discard the others. In basis reconciliation, Alice and Bob reveal their choices of bases via an authenticated public channel and only keep the data in which they use the same basis. Then error correction and privacy amplification are performed for final key distillation.

Since Charlie only serves as an untrusted relay for BSM, there is no leakage of key information even if the detection system is under the control of an eavesdropper. MDI-QKD closes all detection loopholes and is immune to side-channel attacks on imperfect detectors. Certification of detection systems has been the major hurdle to the standardization of QKD, since manufacturers can steal key information by exploiting the loopholes of detectors. MDI-QKD solves this problem since no detector certification is needed.

SUMMARY

The present embodiments feature a scalable architecture for measurement-device-independent quantum key distribution (MDI-QKD). In this architecture, several user nodes are connected to an untrusted central hub, or relay node, named Charlie. In particular, consider one user, named Alice, who wants to transmit a quantum key to another user named Bob. To do so, Alice generates photonic qubits that she transmits to Charlie via an optical fiber. Bob similarly generates photonic qubits that he transmits to Charlie via optical fiber. Charlie performs Bell-state measurements with Alice's and Bob's qubits and publicly announces whether or not each measurement was successful. To enhance success of the Bell-state measurements, Alice's and Bob's qubits should be indistinguishable to Charlie, i.e., the qubits should have the same wavelength/frequency, arrival time, polarization, and phase.

The present embodiments include devices and methods that allow Alice and Bob to calibrate the wavelength/frequency, time delay, polarization, and phase of their transmitted qubits, thereby ensuring indistinguishability to Charlie. The present embodiments work for all encoding schemes used for MDI-QKD, in particular polarization encoding and time-bin phase-encoding. For wavelength calibration, Charlie has a laser that serves as a wavelength reference for Alice and Bob. Charlie splits the output of this wavelength-calibration laser into two wavelength-calibration signals that he sends to Alice and Bob. Alice and Bob each have a local laser diode that they modulate to generate weak coherent pulses that are transmitted to Charlie. Alice and Bob each injection-lock their laser diode with their received wavelength-calibration signal, thereby ensuring that their lasers emit at the same wavelength.

Advantageously, the present embodiments enable scalable MDI-QKD networks by eliminating the need for auxiliary channels between Alice and Bob. Each new node added to the network requires only one uplink and one downlink between the new node and Charlie, and thus the number of links scales linearly with the number of users (i.e., is "scalable"). By contrast, for a network with auxiliary channels between all pairs of users, the number of links scales quadratically with the number of users. The present embodiments therefore reduce the number of links needed to implement a MDI-QKD network, in turn reducing cost and simplifying network maintenance.

For time calibration, Charlie has a second laser that he modulates synchronously with a reference clock. The output of this synchronization laser is split into two optical clock signals that are also transmitted to Alice and Bob. These clock signals have a different wavelength than the wavelength-calibration signals, and therefore each clock signal can be multiplexed with a wavelength-calibration signal for transmission over the same optical fiber. Alice and Bob each have a wavelength-division multiplexer for separating the two signals. Alice and Bob can use the optical clocks signal to delay qubit transmission, thereby compensating for different propagation times to Charlie and ensuring that their qubits arrive simultaneously at Charlie.

For time-bin phase encoding, some of the present embodiments include devices and methods for phase calibration. Specifically, Charlie pulses the output of the wavelength-calibration laser and sends the pulses through a reference asymmetric Mach-Zehnder interferometer that establishes a reference phase shift between two time bins. The pulses outputted by the asymmetric Mach-Zehnder interferometer are then transmitted to Alice and Bob, who each have their own local asymmetric Mach-Zehnder interferometer. Alice and Bob each use the received pulses to adjust a phase shifter in their local Mach-Zehnder interferometer to ensure that their asymmetric Mach-Zehnder interferometers impart the same phase shifts onto their transmitted qubits.

In embodiments, a node for a measurement-device-independent quantum key distribution network includes a laser diode that emits a sequence of optical pulses and a qubit encoder that encodes a logical qubit in each of the optical pulses to create a sequence of photonic qubits. The node also includes an injection-locking circulator that forward couples the sequence of optical pulses from the laser diode to the qubit encoder, and a calibrator that couples a wavelength-calibration signal from a hub of the quantum key distribution network to the injection-locking circulator. The injection-locking circulator reverse couples the wavelength-calibration signal into the laser diode to injection-lock the laser diode.

In other embodiments, a hub for a measurement-device-independent quantum key distribution network includes a wavelength-calibration laser, an optical splitter that splits an output of the wavelength-calibration laser into first and second wavelength-calibration signals, a first optical output that transmits the first wavelength-calibration signal to a first node of the quantum key distribution network, a second optical output that transmits the second wavelength-calibration signal to a second node of the quantum key distribution network, a first optical input that receives a first photonic qubit from the first node, a second optical input that receives, from the second node, a second photonic qubit synchronously with the first photonic qubit, and a Bell-state measurer that performs a Bell-state measurement with the first and second photonic qubits.

DETAILED DESCRIPTION

Many prepare-and-measure quantum key distribution (QKD) protocols are limited to short transmission distances due to the attenuation of optical fiber. In contrast, measurement-device-independent QKD (MDI-QKD) doubles transmission distance by making Alice and Bob exchange keys via an untrusted relay, which is suitable for not only terrestrial but also space-based implementations. Meanwhile, MDI-QKD is intrinsically desirable for access networks with star or tree topologies where the untrusted relay is located at the hub. It can also be used for ground-to-space QKD, where a satellite serves as the untrusted relay of several ground stations. In a MDI-QKD network, each user only needs commercial off-the-shelf optoelectronic devices for qubit preparation. The most complicated and expensive components are single-photon detectors (SPDs), which are centralized at the relay and shared by multiple users. To add a new user, only lasers and modulators are needed and there is no upgrade for the relay node. The low hardware requirement for each user and small upgrade cost makes MDI-QKD systems scalable for large QKD networks.

Figures 1A, 1B, 1C:
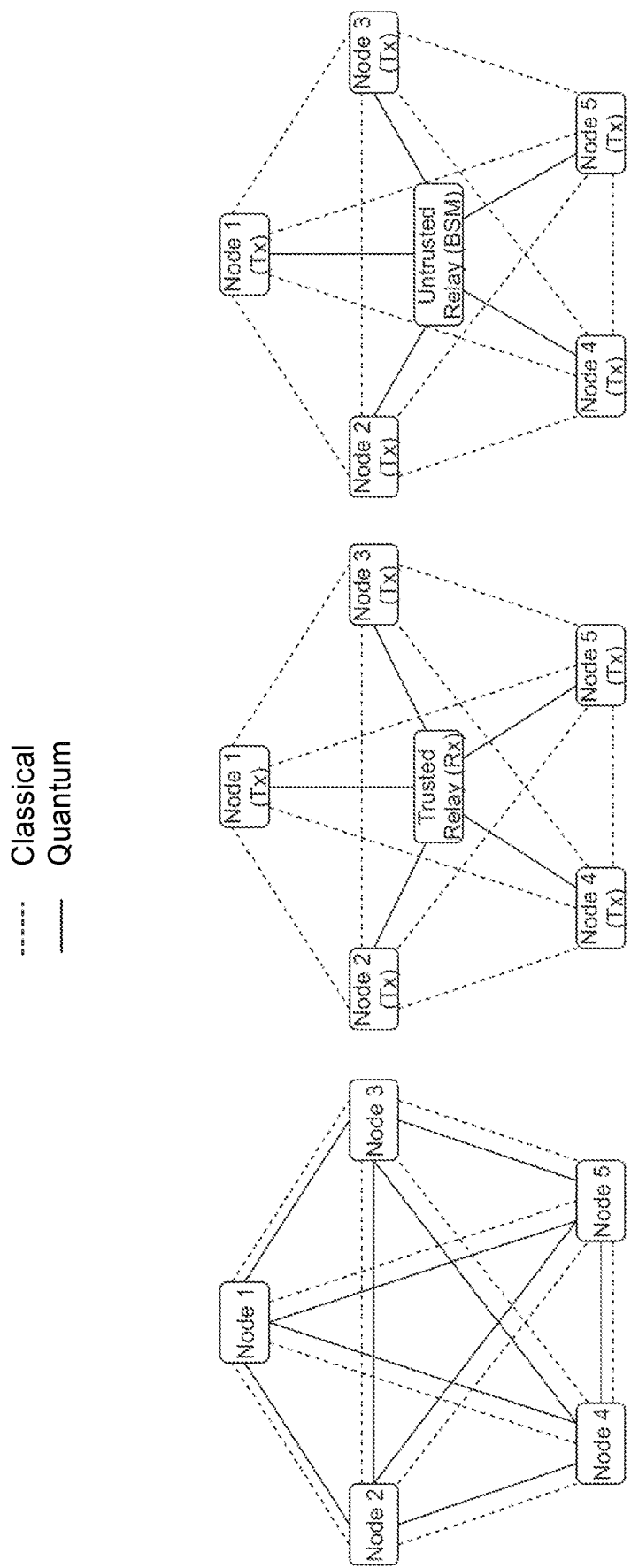
FIG. 1A shows a point-to-point network topology.
FIG. 1B shows a trusted-relay network topology in which each user node exchanges keys with a trusted relay node.
FIG. 1C shows an untrusted-relay network topology for measurement-device-independent quantum key distribution (MDI-QKD).

FIG. 1A shows a point-to-point network topology. Most prepare-and-measure QKD protocols utilize this point-to-point network topology and cannot handle more complicated topologies. In FIG. 1A, each classical communication link needs a dedicated quantum link for key exchange. Accordingly, the number of quantum links increases quadratically with the number of user nodes. As a result, the point-to-point network topology is expensive and impractical to deploy even though it is resilient against cyber-attacks since one compromised user node does not affect the security of the other user nodes.

FIG. 1B shows a trusted-relay network topology in which each user node exchanges keys with a trusted relay node. This topology simplifies the QKD network by reducing the number of quantum links. Specifically, only one quantum link is needed when adding a new user node. Given the imbalanced hardware requirements of WCP sources and SPDs, expensive SPDs are concentrated in the relay node and shared among multiple user nodes, leaving only WCP sources at each user node. This topology reduces system cost and eases deployment, but places the overall network security solely on the relay node. Since the relay node knows all the keys, once it is compromised, the whole network is breached.

FIG. 1C shows an untrusted-relay network topology for MDI-QKD. By replacing the trusted relay node with an untrusted relay node, any two user nodes can exchange their keys via the untrusted relay node without any information being leaked. In MDI-QKD, two user nodes send independently prepared quantum states to the untrusted relay node. The untrusted relay node is used as a public detection server to perform BSM on the incoming WCPs and publicize whether or not the BSMs were successful. Since the untrusted relay node has no information about the states that Alice and Bob sent, it does not need to be trusted or certified. MDI-QKD is more resilient than the trusted-relay topology of FIG. 1C since an attack on the untrusted relay node provides no information about the keys.

Figures 2A, 2B:
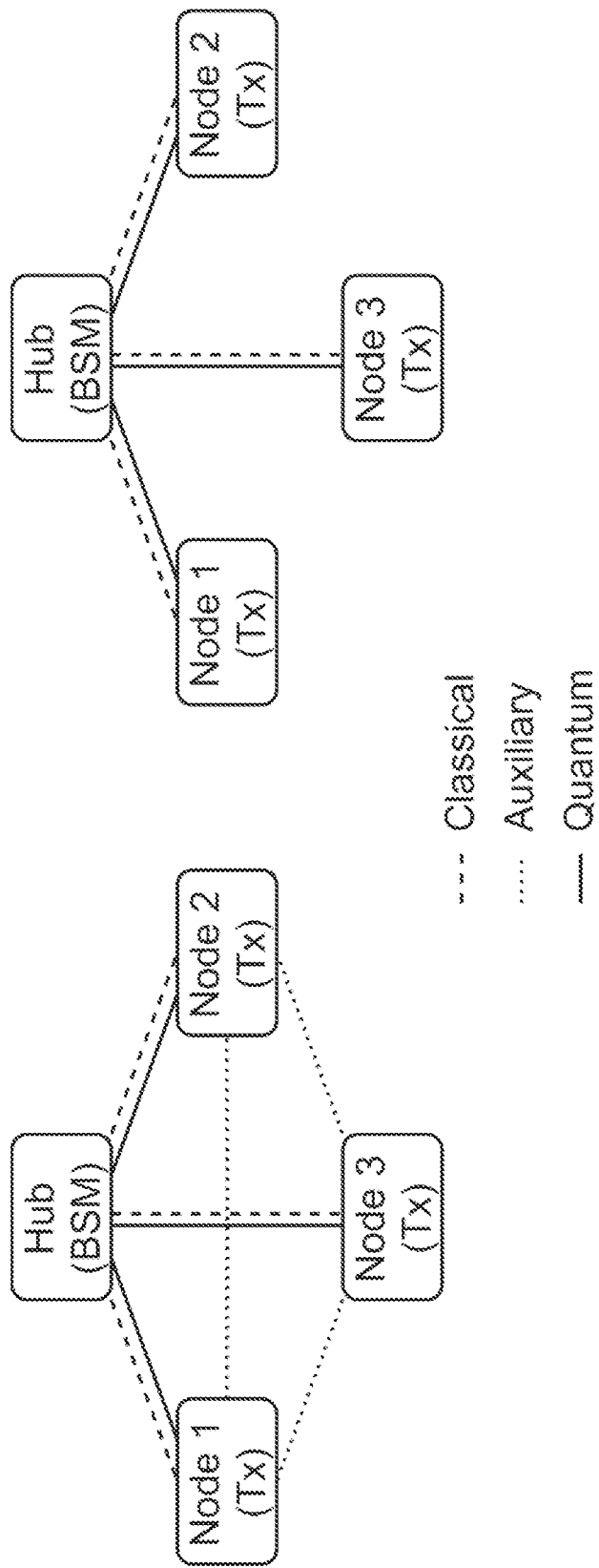
FIG. 2A shows a MDI-QKD network with auxiliary service channels.
FIG. 2B shows a scalable architecture for MDI-QKD networks, in embodiments.

FIG. 2A shows a MDI-QKD network with auxiliary service channels. Despite the aforementioned advantages of MDI-QKD, no scalable architecture for MDI-QKD networks has yet been discovered. This is because existing MDI-QKD networks need additional classical communication links between every pair of user nodes. These additional links, referred to as as auxiliary service channels, are shown in FIG. 2A. To guarantee the indistinguishability of WCPs, these auxiliary service channels are used for timing, wavelength, and polarization calibrations between user nodes. Every time a new user node is added to the network, new auxiliary links need to be deployed to all existing user nodes. The total number of auxiliary links therefore increases quadratically with the number of users.

FIG. 2B shows a scalable architecture for MDI-QKD networks. In this architecture, auxiliary service channels are advantageously incorporated into existing classical communication links between each user node and the relay, as shown in FIG. 2B. By removing auxiliary service links, the network topology is simplified and easier to deploy and service. When a new user node is added, only one classical link and one quantum link are needed.

Figure 3A:
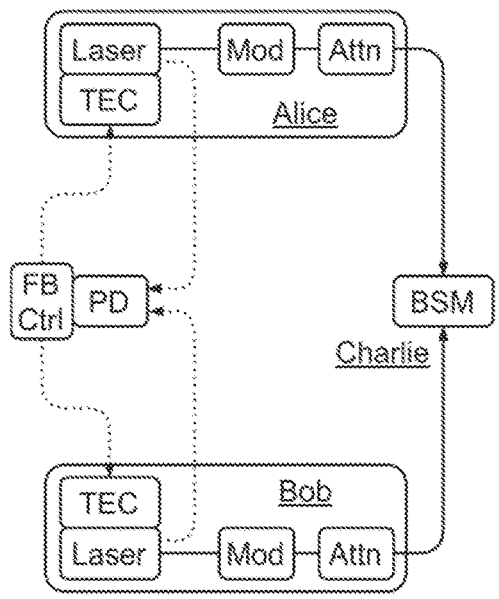
FIG. 3A shows a technique for wavelength calibration based on a beat note between two lasers.
Figure 3B:
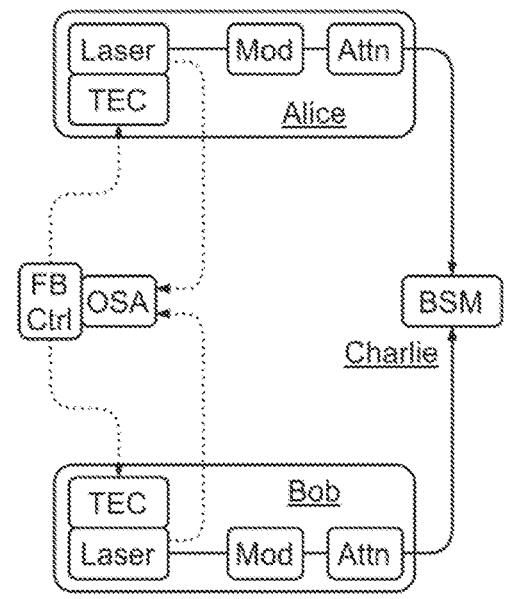
FIG. 3B shows a technique for wavelength calibration that is similar to that of FIG. 3A except that the photodetector is replaced by an optical spectrum analyzer.
Figure 3C:
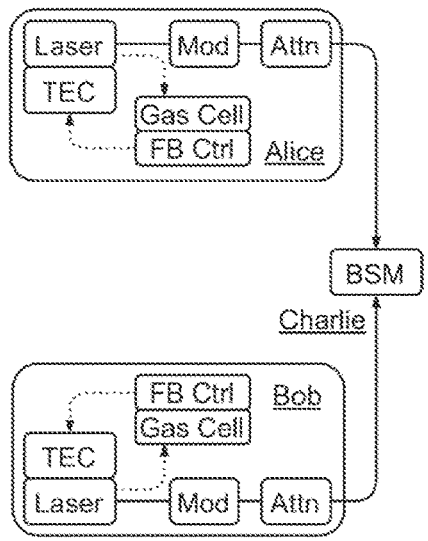
FIG. 3C shows a technique for wavelength calibration based on laser locking to an atomic or molecular absorption line.

In MDI-QKD systems, to guarantee the indistinguishability between photons from independent lasers of two users, timing, wavelength, and polarization calibrations between two lasers are needed. While delay and polarization control techniques are mature and well-known in the art, wavelength calibration remains a challenge. FIGS. 3A-3C show existing techniques for wavelength calibration. All of these techniques utilize similar laser diodes at each user node to ensure that their central wavelengths and full widths at half maximum are as close to each other as possible. When the wavelengths are the same (e.g., to within a threshold or tolerance level), the wavelengths are said to be calibrated. Each laser diode may include or be in contact with a thermoelectric cooler TEC or heater to tune its wavelength by controlling its temperature.

FIG. 3A shows a technique for wavelength calibration based on a beat note between two lasers. The outputs of Alice's and Bob's lasers are combined at a photodetector to create the beat note, whose frequency is monitored. If the difference in frequency between Alice's and Bob's lasers exceeds a threshold (e.g., 10 MHz) a feedback control circuit adjusts the TEC of one or both of the lasers to bring their wavelengths back into calibration. In this technique, a photodetector and feedback circuit are needed in the auxiliary link between Alice and Bob.

FIG. 3B shows a technique for wavelength calibration that is similar to that of FIG. 3A except that the photodetector is replaced by an optical spectrum analyzer (OSA). This technique is suitable for a laboratory environment but is expensive due to the cost of OSA. Furthermore, the precision of the wavelength control is limited by the resolution of the OSA.

FIG. 3C shows a technique for wavelength calibration in which each of Alice's and Bob's lasers is locked to an atomic or molecular absorption line. A gas cell, such as HCN, is integrated into the laser system and locks the wavelength to a molecular absorption line. This solution provides the highest precision and stability of wavelength control and eliminates any auxiliary link among users. But it is expensive for real-world deployment due to the high cost of the gas cell and optics needed to probe and detect the absorption line.

Figure 3D:
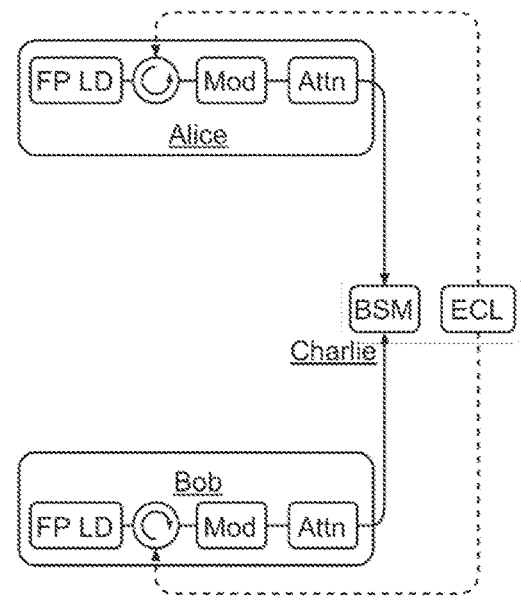
FIG. 3D shows a method for wavelength calibration that is based on injection locking, in embodiments.

FIG. 3D shows a method for wavelength calibration that is based on injection locking. Alice and Bob each use a Fabry-Perot (FP) laser diode (LD) as a pulsed light source. An external cavity laser (ECL) at the relay node injects light into the FP-LDs via existing classical fiber links. Once injection-locked, the wavelength of the FP-LDs will follow the wavelength of the ECL. A circulator before each FP-LD separates its output from the injection light. Since this method of wavelength calibration uses existing classical links between the relay node and the user nodes, this solution needs no auxiliary links. Due to the low-cost of FP-LDs, it also lowers the setup cost of each user node. Compared with the techniques shown in FIGS. 3A-3C, the cost of an ECL is much lower than frequency-locked lasers or deploying auxiliary service links. More importantly, the cost of an ECL is shared by multiple users. In some networks, ECLs are already equipped at the hub for classical communications, which further reduces deployment cost.

Figure 4B:
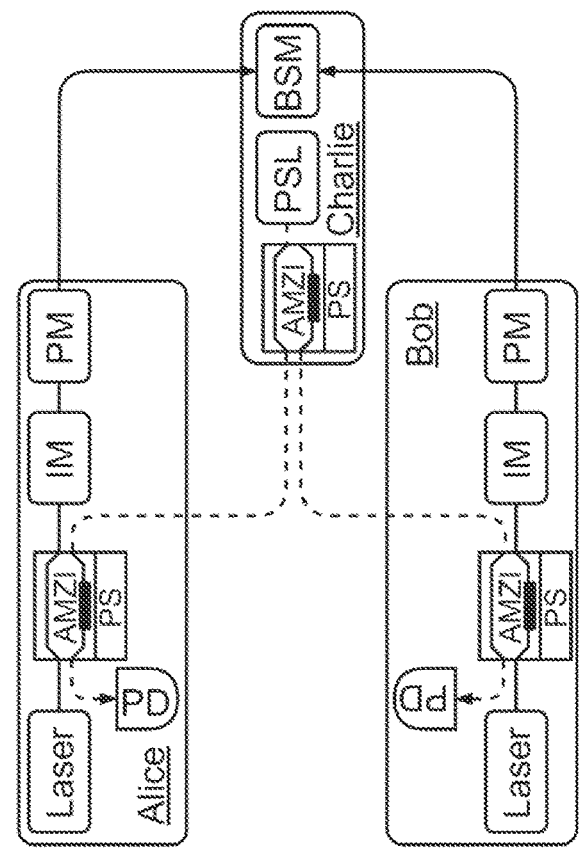
FIG. 4B shows a method for phase calibration, in embodiments.
Figure 4A:
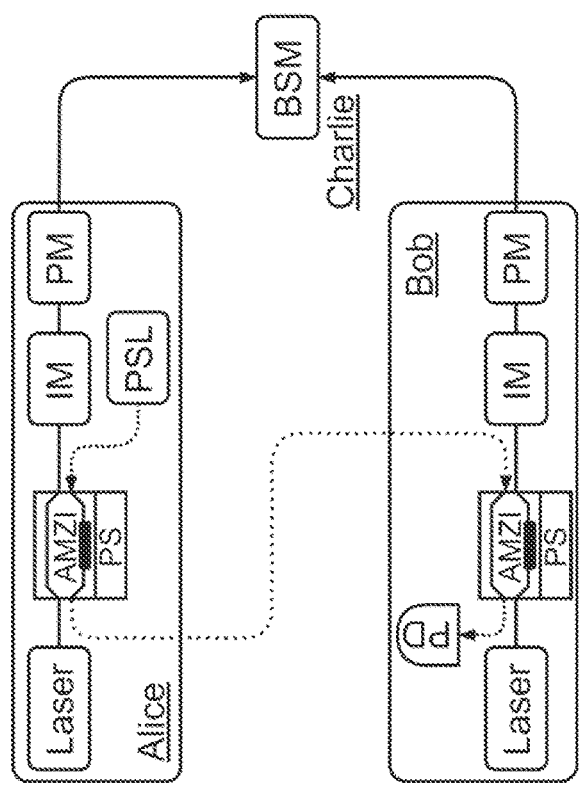
FIG. 4A shows a technique for phase calibration.

FIG. 4A shows a technique for phase calibration. To implement time-bin phase encoding, Alice and Bob each use an asymmetric Mach-Zehnder interferometer (AMZI) and intensity modulator (IM) to encode qubits onto WCPs. The AMZI has unbalanced arm lengths, which separates each pulse into two time-bins and introduces a phase shift between them. The phase difference between the two arms fluctuates with temperature and fiber stress, and introduces errors to key bits in the X basis. To isolate the AMZI from temperature and stress perturbations, it may be thermally isolated (e.g., put in a container) and operated at a calibrated phase difference. In FIG. 4A, a phase stabilization laser (PSL) having the same wavelength as the quantum pulse is used at Alice's node with its output pulses passing through both Alice's and Bob's AMZI. To avoid interference, these calibration pulses propagate through each AMZI in the opposite direction to that of the quantum pulses. By monitoring the optical power at one output port of Bob's AMZI with a photodetector (PD), and adjusting the phase shifter (PS) inside Bob's AMZI, the phase difference of two AMZIs may be calibrated. This method is not scalable for more than two users since it requires additional PSLs and auxiliary fiber links as the number of user nodes grows.

FIG. 4B shows a method for phase calibration. Instead of calibrating all of the AMZIs with each other, an AMZI at the relay node acts as a shared reference that may be used to calibrate all user AMZIs. The reference and user AMZIs should have similar length difference and phase shift between their two arms. In this method, only one PSL is used at the relay node, with its output pulses passing through existing classical fiber links to each user node. To avoid interference, phase calibration pulses counter-propagate with respect to quantum pulses. For calibration, each user monitors the output power of its AMZI and adjusts the corresponding PS accordingly. Advantageously, the method of FIG. 4B reuses existing classical fiber-optic links and eliminates auxiliary links among users.

Figure 5:
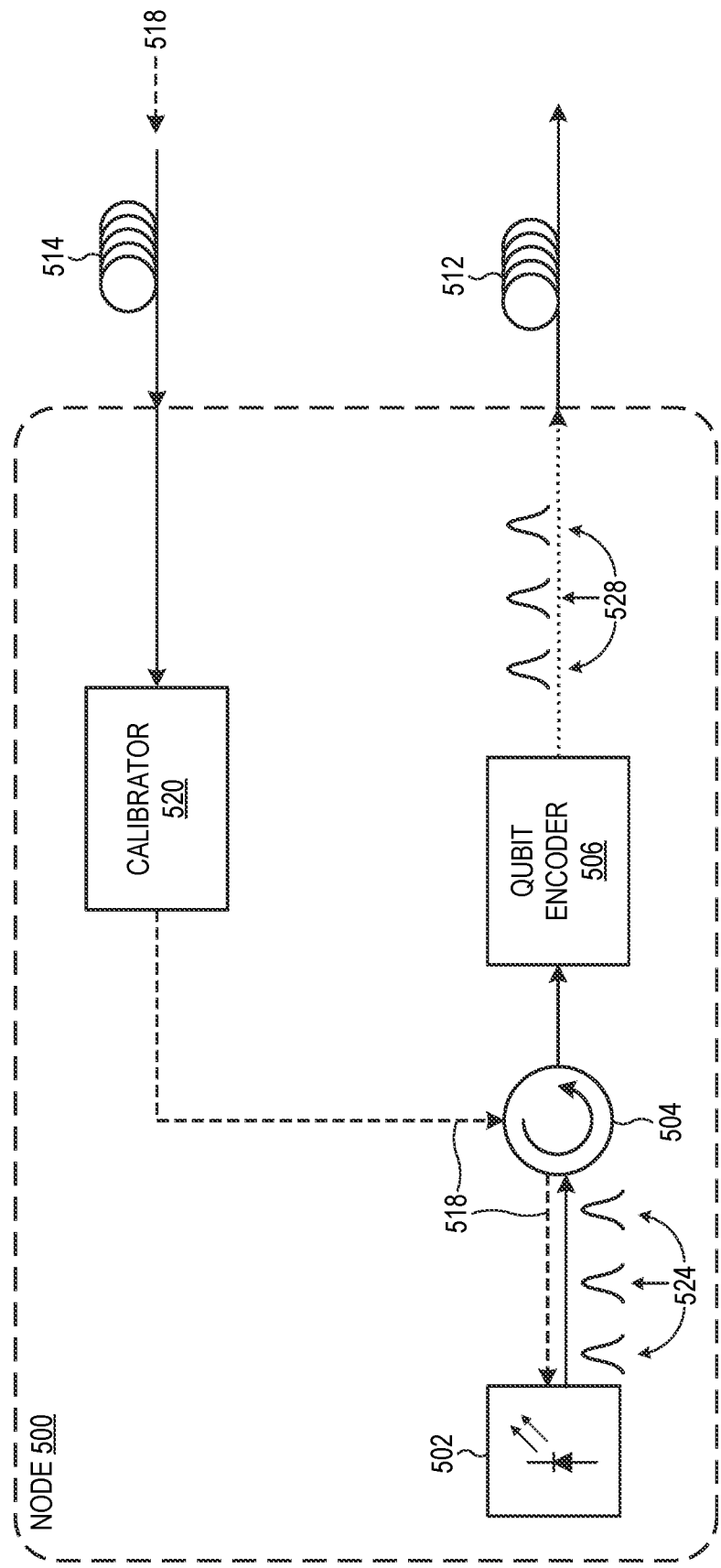
FIG. 5 is a functional diagram of a user node for a MDI-QKD network, in embodiments.

FIG. 5 is a functional diagram of a user node 500 for a MDI-QKD network. The user node 500 may be simply referred to as a "node". The node 500 has a laser diode 502 that is modulated to emit a sequence of optical pulses 524, a qubit encoder 506 that encodes a logical qubit in each optical pulse 524 to create a sequence of photonic qubits 528, and a circulator 504 that is located between the laser diode 502 and the qubit encoder 506. The circulator 504 forward couples the optical pulses 524 from the laser diode 502 to the qubit encoder 506 while reverse coupling a wavelength-calibration signal 518 into the laser diode 502. The wavelength-calibration signal 518 injection locks the laser diode 502, thereby ensuring that the wavelength of the optical pulses 524 is similar to that of the wavelength-calibration signal 518.

To illustrate forward and reverse coupling through the circulator 504, the optical pulses 524 are represented in FIG. 5 by a solid line while the wavelength-calibration signal 518 is represented by a dashed line. To differentiate the photonic qubits 528 from the optical pulses 524 (which do not have encoded information), the photonic qubits 528 are represented by a dotted line.

The wavelength-calibration signal 518 is coupled into the circulator 504 using a calibrator 520, which receives the wavelength-calibration signal 518 from a hub of the MDI-QKD network (e.g., see the hub 700 of FIG. 7) via an optical fiber 514. The calibrator 520 represents all components that receive and couple the wavelength-calibration signal 518 into the circulator 504. For example, when the circulator 504 is a fiber-optic circulator, the calibrator 520 may be as a simple as a fiber-optic patchcord or pigtail that connects between the optical fiber 514 and the circulator 504. The calibrator 520 may additionally include one or both of a polarization controller (e.g., a fiber squeezer) that controls the polarization of the wavelength-calibration signal 518 and an amplitude controller (e.g., a variable optical attenuator) that controls the power of the wavelength-calibration signal 518.

In another example, the circulator 504 is a free-space optical component, such as a Faraday isolator. In this case, the calibrator 520 may include one or more of a collimator that couples the wavelength-calibration signal 518 from the optical fiber 514 into a free-space beam, one or more mirrors that steer the free-space beam into the Faraday isolator, a waveplate for controlling the polarization of the free-space beam, and additional optics for mode-matching the free-space beam to the laser diode 502. The calibrator 520 may include a mixture of free-space and fiber-optic based components, and may include alternative or additional components to those described above without departing from the scope hereof.

The photonic qubits 528 are transmitted to a hub of the MDI-QKD network via an optical fiber 512. Like the optical fiber 514, the optical fiber 512 may be part of a classical optical-fiber-based communication network. In embodiments, the node 500 receives the wavelength-calibration signal 518 from, and transmits the photonic qubits 528 to, the same hub (e.g., see FIGS. 9 and 10). In this case, the optical fibers 512 and 514 may be uplink and downlink connections, respectively, of a point-to-point data link between the node 500 and the hub. Although not shown in FIG. 5, the node 500 may include any components needed for coupling the photonic qubits 528 into the optical fiber 512 (e.g., collimator, lens, patchcord, etc.).

Figure 9:
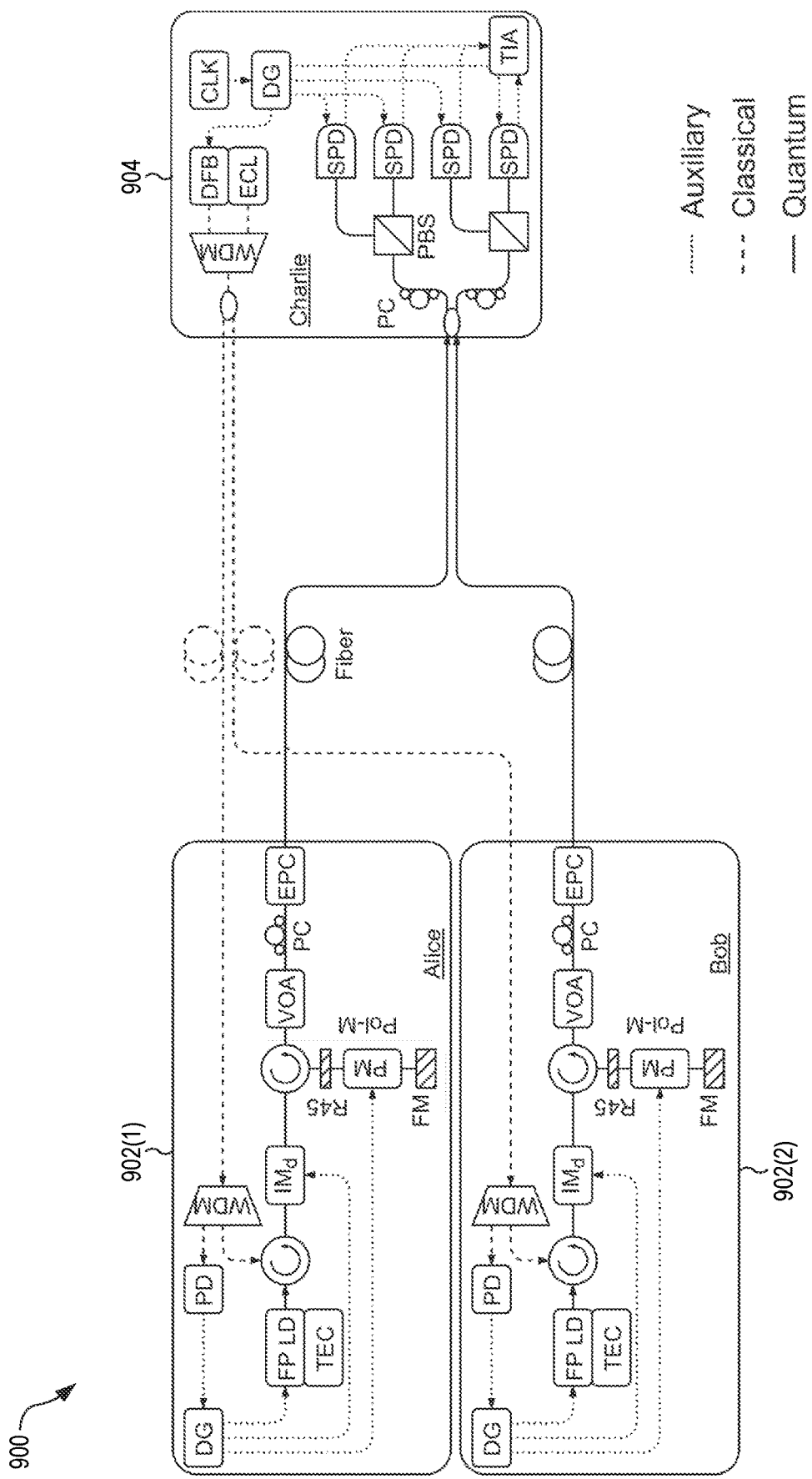
FIG. 9 shows a MDI-QKD network having a first node, a second node, and a hub, in an embodiment.
Figure 10:
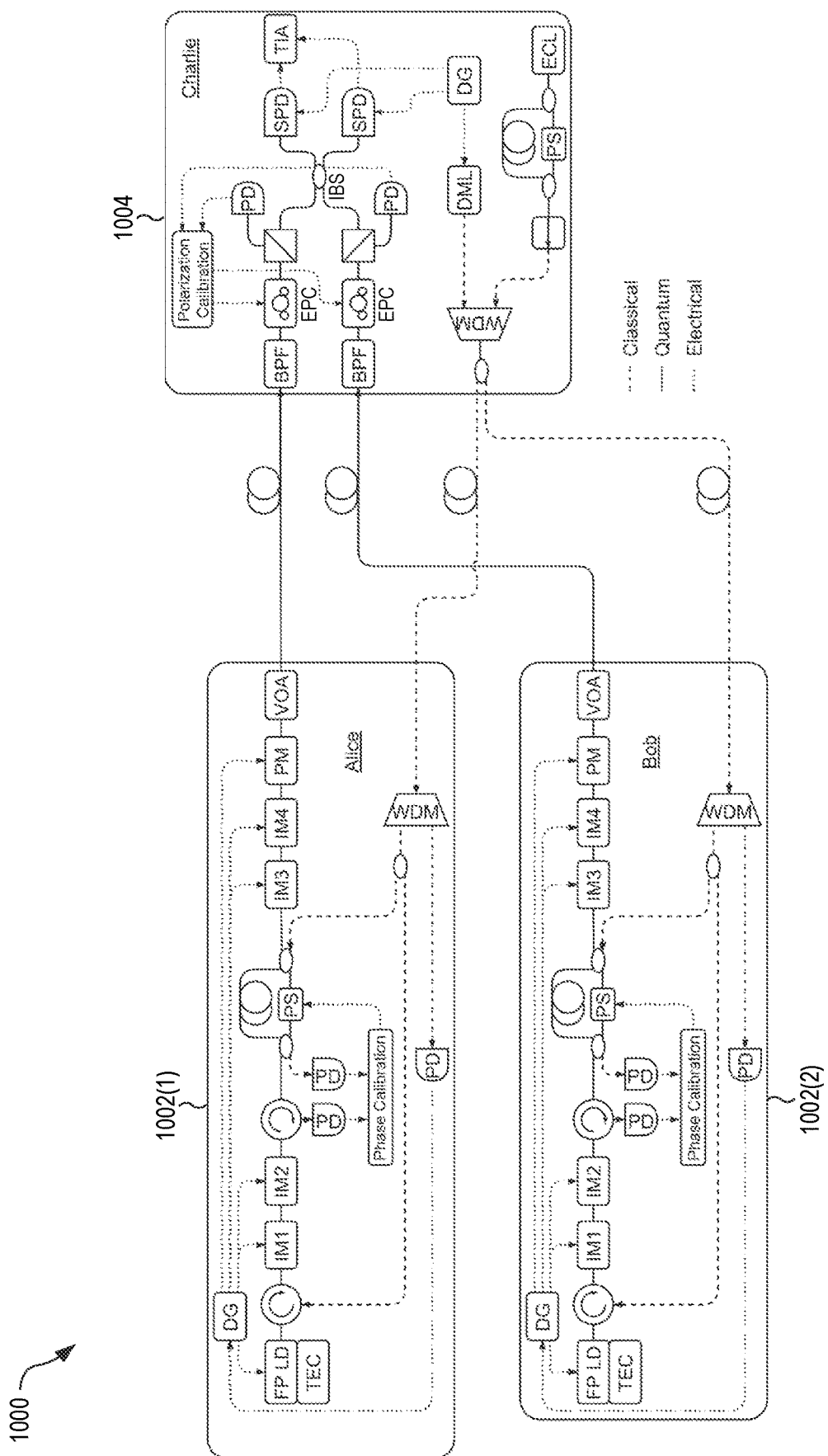
FIG. 10 shows a MDI-QKD network that is similar to the MDI-QKD network of FIG. 9 except that it is configured for time-bin phase-encoding, in an embodiment.

The qubit encoder 506 encompasses all components for encoding logical qubits in the optical pulses 524. For example, the qubit encoder 506 may be used for polarization encoding, as shown in FIG. 9, or time-bin phase-encoding, as shown in FIG. 10. However, the qubit encoder 506 may implement a different type of encoding compatible with MDI-QKD without departing from the scope hereof. The qubit encoder 506 may also include one or more components for decoy-state generation (e.g., an intensity or amplitude modulator). The qubit encoder 506 may also include one or more components that attenuate the photonic qubits 528 (e.g., a variable optical attenuator) such that each photonic qubit 528 has a mean photon number near 1. In this case, each photonic qubit 528 is a single-photon pulse. Alternatively, each photonic qubit 528 may be attenuated to have a mean photon number different from 1. To avoid photon-number-splitting attacks, it is common to use pulses with a mean photon number below 1, in which case each photonic qubit 528 may be a weak coherent pulse.

The wavelength-calibration signal 518 may be continuous-wave (cw), in which case the laser diode 502 will always be injection-locked when it is electrically modulated to generate the optical pulses 524. Alternatively, the wavelength-calibration signal 518 may be pulsed (e.g., see the hub 800 of FIG. 8). In this case, each electrical pulse modulating the laser diode 502 should occur while the laser diode 502 is being injection-locked with an optical pulse of the wavelength-calibration signal 518. When this condition is not met (e.g., when the laser diode 502 is electrically pulsed between optical pulses of the wavelength-calibration signal 518), the laser diode 502 may emit an optical pulse 524 while it is not injection-locked, in which case the emitted optical pulse 524 may have a wavelength different from that of the wavelength-calibration signal 518. For this reason, it may be advantageous for the optical pulses of the wavelength-calibration signal 518 to have a duration that is longer than that of the electrical pulses.

In some embodiments, the laser diode 502 is a Fabry-Perot laser diode, which are advantageously low-cost and widely available. However, the laser diode 502 may be another kind of laser diode, injection-lockable laser system, or optical gain medium without departing from the scope hereof. For example, the laser diode 502 cooperates with the circulator 504 to implement reflective amplification of the wavelength-calibration signal 518. Accordingly, in some embodiments the laser diode 502 and circulator 504 are replaced with a reflective semiconductor optical amplifier. In other embodiments, the optical pulses 524 are generated via transmissive amplification of the wavelength-calibration signal 518. For example, the wavelength-calibration signal 518 may seed a transmissive semiconductor optical amplifier that is electrically modulated to generate the optical pulses 524. Many transmissive semiconductor optical amplifiers that are known and used in the art have a structure similar to a Fabry-Perot laser diode, but with anti-reflection coatings to improve coupling of light into and out of the amplifier. Since transmissive amplifiers typically have separate input and output ports (as opposed to reflective amplifiers, which typically have only one port), the circulator 504 may not be necessary for embodiments based on transmissive amplification.

Figure 6:
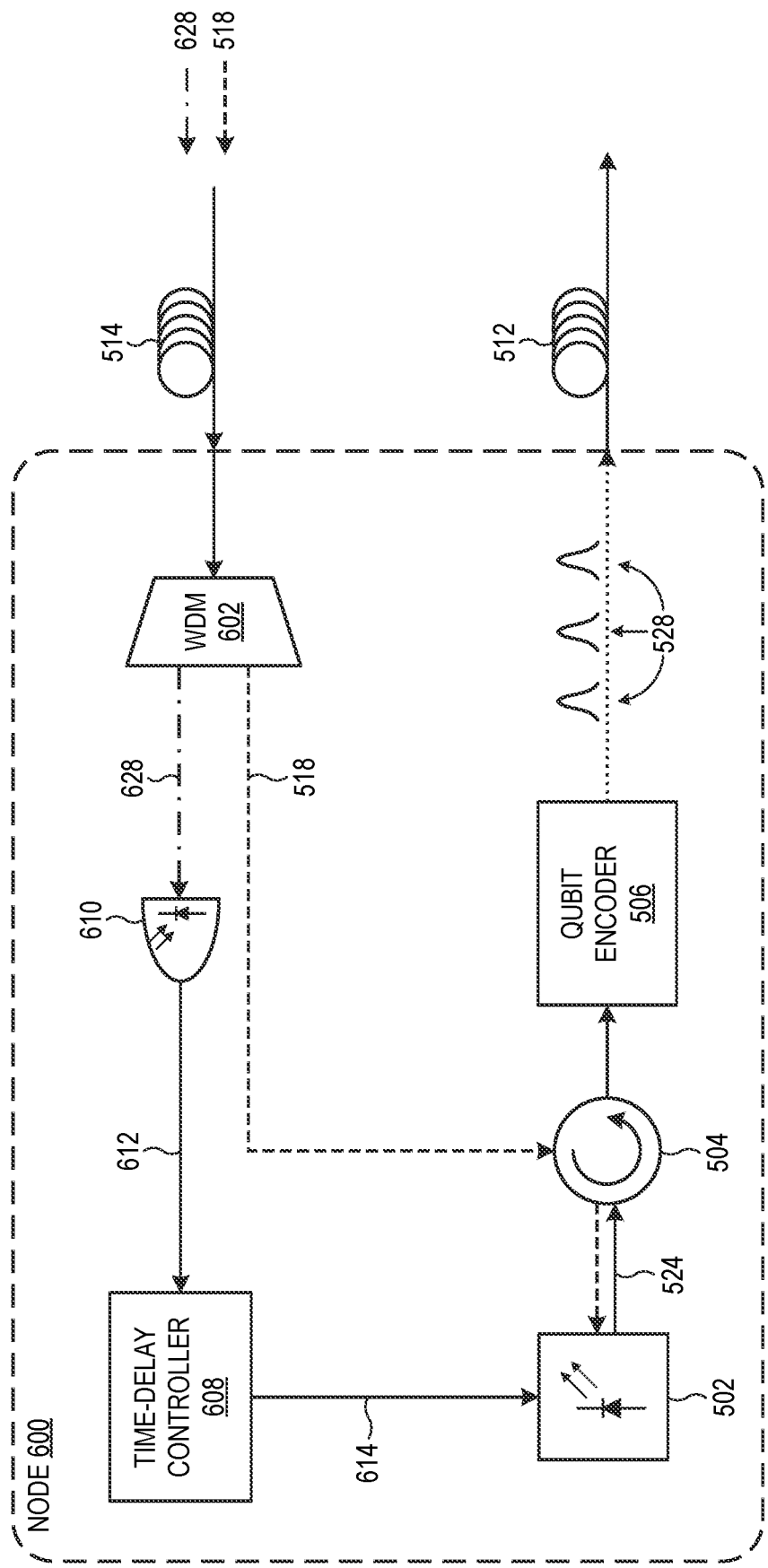
FIG. 6 is a functional diagram of a user node that is similar to the user node of FIG. 5, in embodiments.

FIG. 6 is a functional diagram of a user node 600 that is similar to the user node 500 of FIG. 5 except that it also receives an optical timing signal 628 via the optical fiber 514. The optical timing signal 628 and wavelength-calibration signal 518 both propagate along the optical fiber 514, and therefore may both be generated by the same hub (e.g., see the hub 800 in FIG. 8). The optical timing signal 628 and wavelength-calibration signal 518 have different wavelengths. Accordingly, the node 600 includes a wavelength-division multiplexer (WDM) 602 for optically separating the optical timing signal 628 and wavelength-calibration signal 518. The WDM 602 may be considered an example of, or a part of, the calibrator 520 of FIG. 5.

The node 600 also includes a photodetector 610 that detects the optical timing signal 628. The optical timing signal 628 is pulsed according to a reference clock (e.g., see the reference clock 806 in FIG. 8), and therefore the photodetector 610 outputs an electronic timing signal 612 that is also pulsed. The node 600 may include circuitry that processes the electronic timing signal 612 such that the node 600 operates synchronously with the reference clock. For example, in FIG. 6 the node 600 has a time-delay controller 608 that generates, based on the electronic timing signal 612, a modulation signal 614 for directly modulating the laser diode 502. The time-delay controller 608 may include a programmable delay generator that delays transmission of the photonic qubits 528 to control when they arrive at the hub. As described in more detail below, the time-delay controller 608 may be programmed or configured such that each of the photonic qubits 528 arrives at the hub simultaneously with one photonic qubit transmitted to the hub from another node, which ensures photonic qubits from different nodes are temporally indistinguishable at the hub. Although not shown in FIG. 6, the modulation signal 614 may also be used by the qubit encoder 506 (e.g., see FIGS. 9 and 10).

Figure 7:
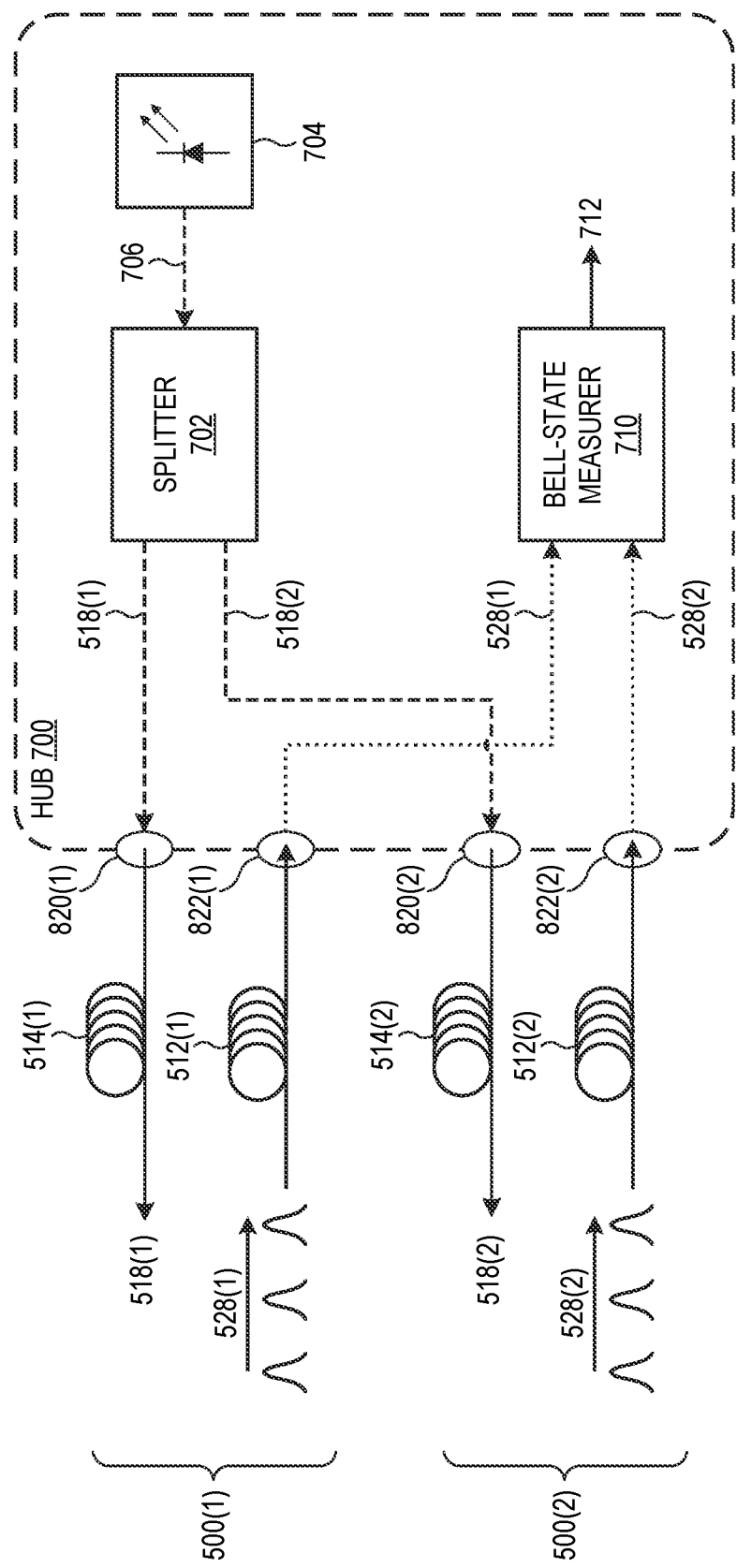
FIG. 7 is a functional diagram of a hub for a MDI-QKD network that operates with two of the node of FIG. 5 and serves as an untrusted relay node for the MDI-QKD network, in embodiments.

FIG. 7 is a functional diagram of a hub 700 for a MDI-QKD network that operates with two of the node 500 of FIG. 5 and serves as an untrusted relay node for the MDI-QKD network. Specifically, the hub 700 has a first optical input 822(1) that receives first photonic qubits 528(1) from a first node 500(1) via a first uplink optical fiber 512(1), and a second optical input 822(2) that receives second photonic qubits 528(2) from a second node 500(2) via a second uplink optical fiber 512(2). The hub 700 also has a wavelength-calibration laser 704 that generates an output 706, and a splitter 702 that splits the output 706 into a first wavelength-calibration signal 518(1) and a second wavelength-calibration signal 518(2). The hub 700 has a first optical output 820(1) that transmits the first wavelength-calibration signal 518(1) to the first node 500(1) via a first downlink optical fiber 514(1), and a second optical output 820(2) that transmits the second wavelength-calibration signal 518(2) to the second node 500(2) via a second downlink optical fiber 514(2).

The hub 700 also includes a Bell-state measurer 710 that performs Bell-state measurements on the first photonic qubits 528(1) and the second photonic qubits 528(2). Specifically, the Bell-state measurer 710 performs each Bell-state measurement using one of the first photonic qubits 528(1) and one of the second photonic qubits 528(2). For each Bell-state measurement, the Bell-state measurer 710 outputs a result 712. Although not shown in FIG. 7, the hub 700 may publicly broadcast whether or not a Bell-state measurement was successful. An example of the Bell-state measurer 710 for polarization encoding is shown in FIG. 9, while an example of the Bell-state measurer 710 for time-bin phase-encoding is shown in FIG. 10.

Figure 8:
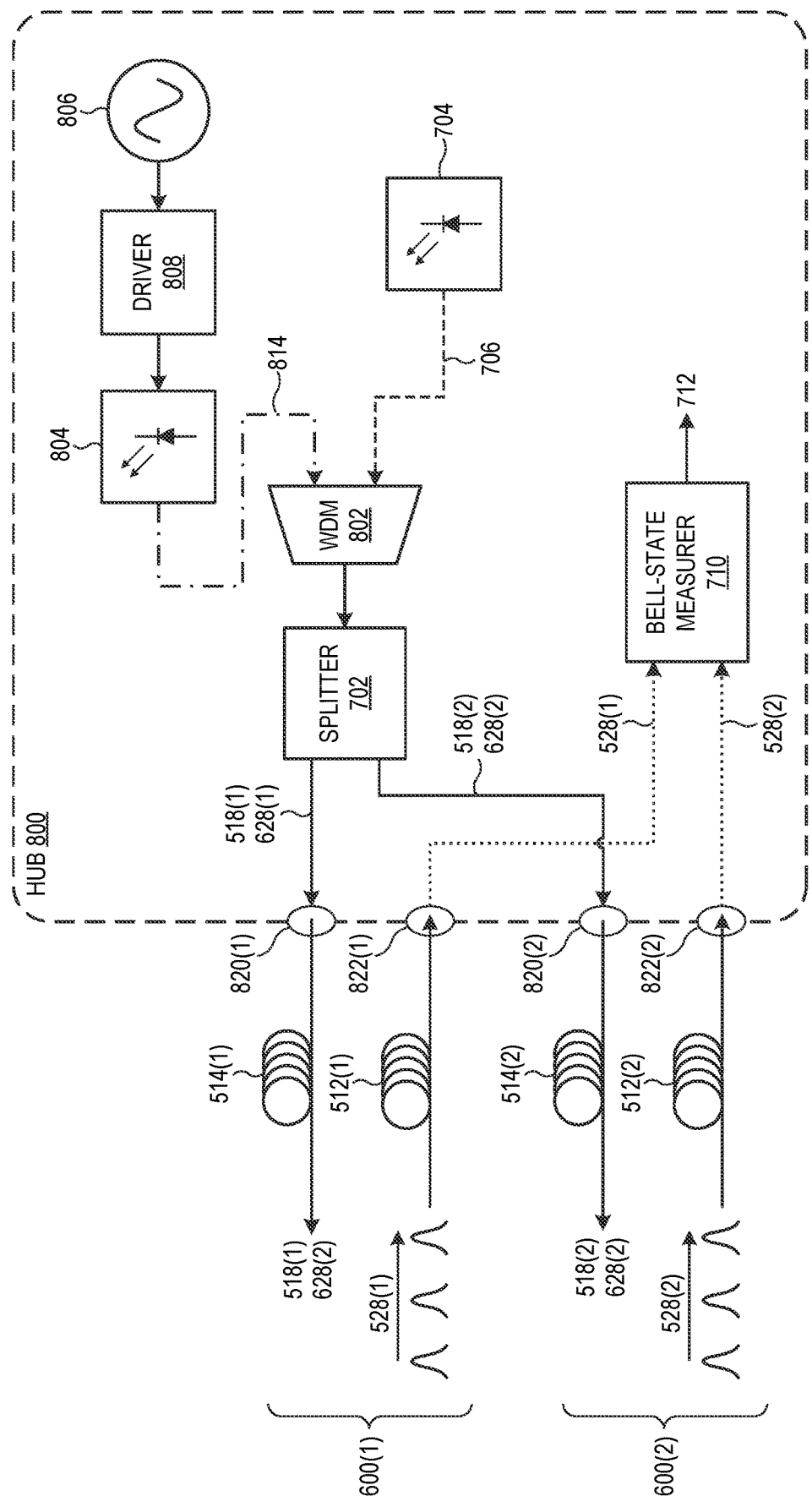
FIG. 8 is a functional diagram of a hub that is similar to the hub of FIG. 7, in embodiments.

FIG. 8 is a functional diagram of a hub 800 that is similar to the hub 700 of FIG. 7 except that it includes a synchronization laser 804 for providing timing signals to two of the node 600 of FIG. 6. Specifically, the hub 800 includes a driver 808 that modulates the synchronization laser 804 synchronously with a reference clock 806 to create a modulated output 814 that is coupled into a wavelength division multiplexer 802. The output 706 from the wavelength-calibration laser 704 is also coupled into the wavelength division multiplexer 802 to combine it with the modulated output 814. The output of the wavelength division modulator is coupled to the splitter 702, which splits the modulated output 814 into a first optical timing signal 628(1) and a second optical timing signal 628(2). Thus, the first optical timing signal 628(1) and the first wavelength-calibration signal 518(1) are both transmitted to the first node 600(1) along the first downlink optical fiber 514(1). Similarly, the second optical timing signal 628(2) and the second wavelength-calibration signal 518(2) are both transmitted to the second node 600(2) via the second downlink optical fiber 514(2).

The optical timing signals 628(1) and 628(2) advantageously allow the nodes 600(1) and 600(2) to operate synchronously without having to directly communicate with each other. Based on the first optical timing signal 628(1), the time-delay controller 608 of the first node 600(1) may be configured to delay transmission of the first photonic qubits 528(1) to compensate for the length of the first uplink optical fibers 512(1). Similarly, based on the second optical timing signal 628(2), the time-delay controller 608 in the second node 600(2) may be configured to delay transmission of the second photonic qubits 528(2) to compensate for the length of the second uplink optical fibers 512(2). The uplink optical fibers 512(1) and 512(2) may have different lengths, depending on the locations of the nodes 600(1) and 600(2) relative to the hub 800. Compensating for different fiber lengths with time-delay controllers 608 and optical timing signals 628(1) and 628(2) therefore provides a way to adjust the arrival time of the photonic qubits 528 at the hub 800 such that each of the first photonic qubits 528(1) arrives at the hub 800 simultaneously with one of the second photonic qubits 528(2), as needed to ensure temporal indistinguishability.

In FIGS. 7 and 8, the wavelength-calibration laser 704 is shown as a diode laser. In one embodiment, the wavelength-calibration laser 704 is an external-cavity diode laser. However, the wavelength-calibration laser 704 may be another type of laser without departing from the scope hereof. In one embodiment, the wavelength-calibration laser 704 is frequency-stabilized by locking its frequency to an atomic or molecular transition in a vapor cell. In the example of FIG. 8, the synchronization laser 804 is shown as a directly modulated diode laser. However, the synchronization laser 804 may be another type of laser without departing from the scope hereof. For example, the synchronization laser 804 may be a cw laser whose output is modulated (e.g., with an amplitude or intensity modulator) synchronously with the reference clock 806 to create the modulated output 814. In some embodiments, the hub 800 excludes the reference clock 806, wherein it receives a timing signal (e.g., a 10 MHz reference) from an external time base, clock, or frequency reference. Alternatively, the hub 800 may include the reference clock 806, but lock its output to the received timing signal.

FIG. 9 shows a MDI-QKD network 900 having a first node 902(1), a second node 902(2), and a hub 904. Each of the nodes 902(1) and 902(2) is an embodiment of the node 600, configured for polarization encoding. The hub 904 is an embodiment of the hub 800, also configured for polarization encoding. For clarity, the nodes 902(1) and 902(2) are named Alice and Bob, respectively, while the hub 904 is named Charlie. In FIG. 9, quantum communication links are shown as solid black lines, classical communication links are shown as dashed lines, and all other auxiliary connections are shown as dotted lines.

Each of the nodes 902(1) and 902(2) uses a Fabry-Perot laser diode (FP-LD) as a pulsed light source. The wavelength synchronization laser is an external cavity laser (ECL) whose output is injected into the FP-LDs via existing classical fiber links. When injection locked, the FP-LDs emits optical pulses with a wavelength similar to that of the ECL. To enhance the visibility of Hong-Ou-Mandel (HOM) interference, the wavelength difference between Alice's and Bob's FP-LDs should be less than 10 MHz. A circulator separates the output of FP-LD from the injection from ECL. The FP-LDs are directly modulated to generate phase randomized pulses. An intensity modulator ($IM_d$) adjusts the photon number per pulse for decoy state generation. A polarization modulator (Pol-M), consisting of an optical circulator, a phase modulator (PM) and a Faraday mirror, encodes the qubits onto four BB84 polarization states. The pulses launched into the PM have a polarization at 45° from the optical axis of the PM waveguide. By modulating the relative phase between two principal modes in the waveguide, four BB84 polarization states can be generated. The Faraday mirror reflects pulses back with 90° polarization rotation. Since the pulse passes through the PM waveguide twice with orthogonal polarizations, polarization mode dispersion and temperature-induced polarization variation are compensated. A variable optical attenuator (VOA) reduces the pulse intensity to single photon level. At Charlie, the two photons from Alice and Bob interfere at a 50:50 beam splitter and are projected to the horizontal and vertical states by two PBSs. They are detected by four SPDs and registered by a TIA.

To enhance the interference visibility, pulses from Alice and Bob should be indistinguishable at Charlie in terms of arrival time, wavelength, and polarization. In FIG. 9, the FP-LDs and modulators at Alice and Bob, and the SPDs at Charlie, are synchronized to a reference clock at Charlie, which drives a directly-modulated distributed feedback (DFB) laser whose output is sent to Alice and Bob via the existing classical fiber links. The DFB laser has a different wavelength from the ECL, and they are multiplexed in the classical fiber link by a wavelength division multiplexer (WDM). At the user site, the optical clock signal is demultiplexed by a WDM and detected by a photodetector (PD). After the PD, the electric clock signal drives a delay generator (DG) and a pattern generator (PG), which in turn controls the FP-LD and modulators. The DG in each node is adjusted according to the node's distance from Charlie to compensate for the path difference, so that photons from Alice and Bob arrive simultaneously at the interference beam splitter at Charlie. Usually, it is required that the DG has a delay resolution of 50 ps and timing jitter less than 100 ps. The master clock also triggers the four SPDs, which work in the gated mode and are open only when the photons arrive.

Polarization calibration ensures that Alice and Bob have the same reference frame for polarization. For the rectilinear basis (i.e., horizontal (H) and vertical (V) polarization directions), Alice's and Bob's horizontal and vertical polarization states need to be aligned to the axes of Charlie's PBSs. This can be achieved by adjusting the polarization controller (PC) at each user. First, Alice and Bob adjust their respective VOA to increase the intensity of the emitted pulses. Alice then sends horizontally polarized pulses to Charlie, while Bob sends vertically polarized pulses. Alice adjusts her PC to minimize the rate at which Charlie detects her pulses with the SPDs, while Bob adjusts his PC to minimize the rate at which Charlie detects his pulses with the SPDs. In this way, Alice's H polarization state and Bob's V polarization state are aligned with the polarizing axes of Charlie's PBSs.

With the rectilinear basis aligned, alignment of the diagonal basis is equivalent to adjusting the phase shift between the H and V polarization components. An electrical polarization controller (EPC) is used to introduce phase retardation between the polarization components along its slow and fast axes. First, Alice aligns her H state to the fast or slow axis of her EPC, after which she adjusts the DC voltage on the EPC until Alice's diagonal basis is aligned with Bob's. Note that the EPC only changes the phase shift between H and V polarization components, but has no disturbance on the previously aligned rectilinear basis.

Finally, HOM interference can be used to monitor the indistinguishability between qubits from Alice and Bob. The HOM dip reflects the overall interference condition and can be used to calibrate all modes including timing, wavelength, and polarization. Once time and polarization are calibrated, HOM visibility depends on the wavelength difference.

FIG. 10 shows a MDI-QKD network 1000 that is similar to the MDI-QKD network 900 of FIG. 9 except that it is configured for time-bin phase-encoding. The MDI-QKD network 1000 has a first node 1002(1) and a second node 1002(2), each of which is an embodiment of the node 600. The MDI-QKD network 1000 also includes a hub 1004 that is an embodiment of the hub 800. Similar to FIG. 9, the nodes 1002(1) and 1002(2) are named Alice and Bob, respectively, and the hub 1004 is named Charlie.

Each of the nodes 1002(1) and 1002(2) uses a directly modulated FP-LD as a pulsed light source, whose output pulses have intrinsically random phase and are immune to unambiguous-state-discrimination attack. An ECL at the hub 1004 outputs light via existing classical fiber links to the FP-LDs for injection locking. To enhance the visibility of HOM interference, the frequency difference between Alice's and Bob's FP-LDs should be less than 10 MHz. A circulator separates the FP-LD output from the injection-locking light from the ECL. This method reuses the existing classical links for wavelength calibration and eliminates the need of auxiliary links between Alice and Bob.

In FIG. 10, the first intensity modulator (IM1) is used for decoy-state generation. By adjusting its driving voltage, a signal state, weak decoy state, and vacuum state may be generated. A second intensity modulator (IM2) is used to normalize the average photon number per pulse for Z and X bases. The AMZI has two unbalanced arms with the path difference longer than the pulse coherent time. Each pulse passing through the AMZI is divided into two time-bins. In the Z basis, key bits are encoded in time bins. A third intensity modulator (IM3) and fourth intensity modulator (IM4) are controlled to pass only one pulse in the two time-bins and block the other. This can be done with a single IM, however two IMs improve the extinction ratio of the vacuum state. In the X basis, key bits are encoded on the relative phase (0 or $\pi$) between the two pulses in two time-bins, which is realized by a PM. Finally, a VOA is used to adjust the intensity of output pulses. During the QKD procedure, pulse intensity is reduced to single-photon level; during time calibration procedure, pulse intensity is set strong enough to accumulate sufficient count for arrival time measurement. Charlie performs BSM for the two pulses sent by Alice and Bob, where they interfere at a 50:50 beam splitter and are detected by two SPDs.

The MDI-QKD network 1000 implements arrival-time calibration and wavelength calibration similarly to the MDI-QKD network 900 of FIG. 9. For phase calibration, the MDI-QKD network 1000 may use the method of FIG. 4B. Specifically, Charlie divides the output pulses of his ECL into two time-bins using a reference AMZI, thereby producing phase calibration pulses. Charlie sends the phase calibration pulses to both Alice and Bob via existing classical fiber links. To avoid interference, the phase calibration pulses pass through Alice's and Bob's AMZI in the opposite direction to that of the quantum pulses. A circulator after IM2 separates the phase calibration pulses from quantum pulses propagating in the opposite direction. Alice measures the optical power of the phase calibration pulses at two ports of her AMZI, and then adjusts the PS of her AMZI according to the measured powers. Bob similarly measures the optical power to control the PS of his AMZI. Thus, both Alice and Bob have an AMZI that is phase-calibrated with respect to Charlie's reference AMZI.

For polarization calibration of the MDI-QKD network 1000, electrical polarization controllers (EPC) and polarized beam splitters are used before the interference beam splitter (IBS). Two photodetectors monitor the power reflected by the PBSs. The EPCs are adjusted according to the reflected power to make sure the incoming pulses are polarized along the p direction of the PBS and thus all optical power can pass through. Moreover, the visibility of HOM interference can also be used to monitor the indistinguishability between photons from Alice and Bob. The HOM dip indicates the overall interference condition and can be used to evaluate the calibration of timing, wavelength, phase, and polarization.

Figure 11:
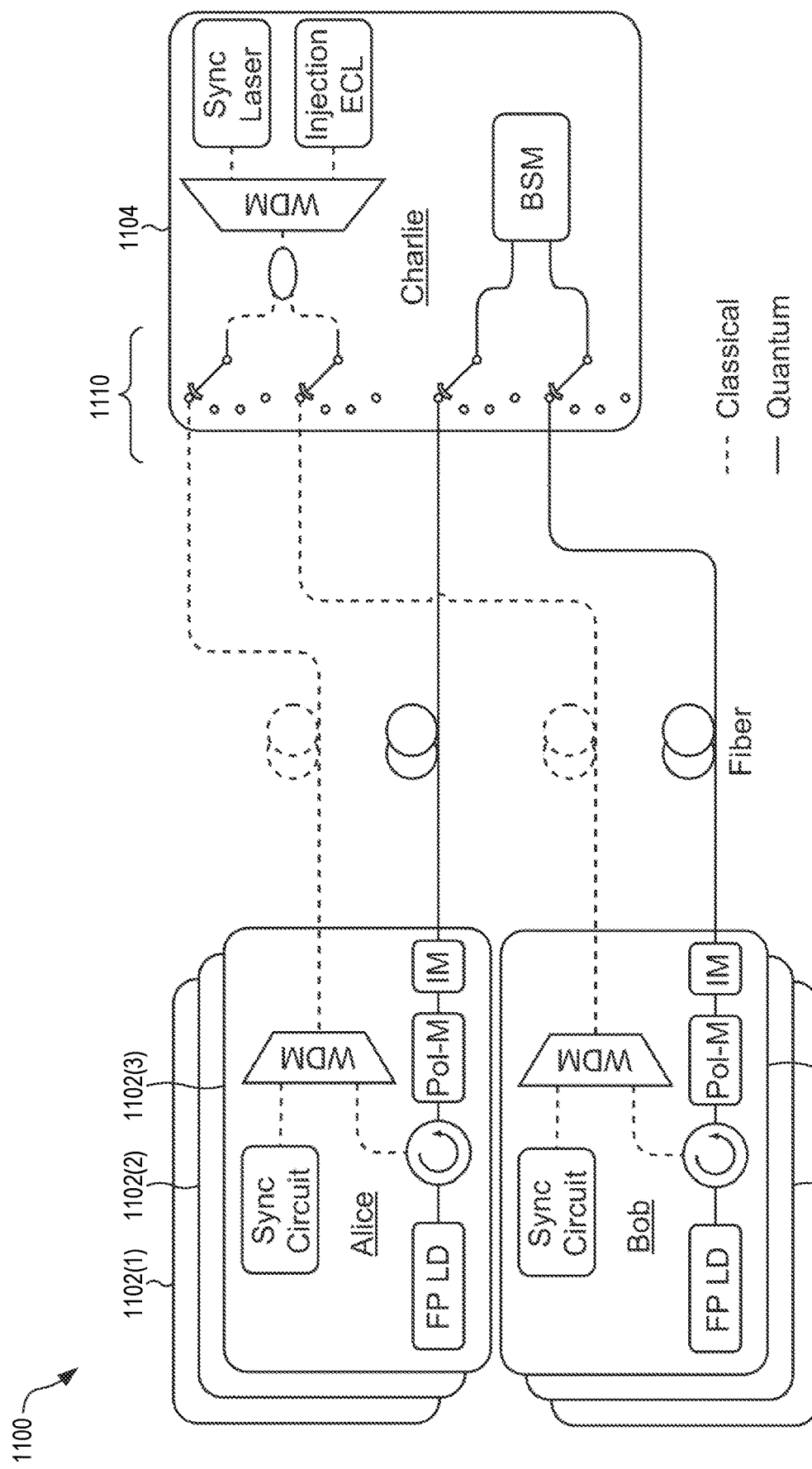
FIG. 11 shows a MDI-QKD network with n user nodes, where n is an integer greater than or equal to three, in embodiments.

FIG. 11 shows a MDI-QKD network 1100 with n user nodes 1102, where n is an integer greater than or equal to three. The MDI-QKD network 1100 has a hub 1104 that is similar to the hub 800 of FIG. 8 except that it includes optical switches 1110 for selecting pairs of the user nodes 1102. In FIG. 11, the switches 1110 are set such that the hub 1104 communicates with Alice (i.e., the user node 1102(3)) and Bob (i.e., the user node 1102(n)). However, the switches 1110 may be adjusted such that the hub 1104 with any other pair of the n user nodes 1102.

FIG. 11 illustrates that to add a new user node 1102 to the MDI-QKD network 1100, only commercial off-the-shelf components are needed, including an FP-LP, modulators, and VOA. Furthermore, only one classical link and one quantum link are needed for the new user node 1102 to communicate with the hub 1104, and no auxiliary channels are needed. While FIG. 11 shows the hub 1104 and nodes 1102 configured for polarization encoding, the hub 1104 and nodes 1102 may be alternatively configured for time-bin phase-encoding or another kind of encoding used for MDI-QKD. Thus, the MDI-QKD network 1100 may be used with any encoding scheme compatible with MDI-QKD.

METHOD EMBODIMENTS

In embodiments, a first method for measurement-device-independent quantum key distribution includes emitting, with a laser diode, a sequence of optical pulses. For example, the laser diode 502 of FIG. 5 emits the sequence of optical pulses 524. The first method also includes forward coupling, with an injection-locking circulator, the sequence of optical pulses into a qubit encoder. For example, the circulator 504 of FIG. 5 forward couples the sequence of optical pulses 524 into the qubit encoder 506. The first method also includes encoding, with the qubit encoder, a logical qubit in each of the optical pulses to create a sequence of photonic qubits. For example, the qubit encoder 506 creates the sequence of photonic qubits 528. The first method also includes receiving a wavelength-calibration signal from a hub of a quantum key distribution network and reverse coupling, with the injection-locking circulator, the wavelength-calibration signal into the laser diode to injection-lock the laser diode. For example, the calibrator 520 receives the wavelength-calibration signal 518 and the circulator 504 reverse couples the wavelength-calibration signal 518 into the laser diode 502. Said emitting with the laser diode may include emitting with a Fabry-Perot laser diode. Said encoding may include creating each of the sequence of photonic qubits as a single-photon pulse or a weakly coherent pulse.

In some embodiments, the first method further includes (i) separating, with a wavelength-division multiplexer, an optical clock signal from the wavelength-calibration signal, (ii) converting, with a photodetector, the optical clock signal into an electronic timing signal, and (iii) electronically controlling, based on the electronic timing signal, one or both of the laser diode and the qubit encoder such that the sequence of photonic qubits is transmitted synchronously with the electronic timing signal. In one example of these embodiments, the WDM 602 of FIG. 6 separates the optical clock signal 628 from the wavelength-calibration signal 518, the photodetector 610 converts the optical clock signal 628 into the electronic timing signal 612, and the time-delay controller 608 controls the laser diode 502 accordingly. The first method may further include delaying the electronic timing signal to create a delayed timing signal, wherein said electronically controlling is based on the delayed timing signal.

In some embodiments of the first method, said encoding includes time-bin phase-encoding the logical qubit in said each of the optical pulses. Said time-bin phase-encoding may use an asymmetric Mach-Zehnder interferometer having (i) a first beamsplitter forming a first input port and a second output port, (ii) a second beamsplitter forming first output port and a second input port, the second input port receiving at least a portion of the wavelength-calibration signal as a sequence of phase-calibration pulses, (iii) a first interferometer arm, coupled between the first and second beamsplitters, having a first arm length and including an optical phase shifter, and (iv) a second interferometer arm, coupled between the first and second beamsplitters, having a second arm length different from the first arm length. In these embodiments, the first method further includes (v) forward coupling, with a phase-calibration circulator, the sequence of optical pulses from the injection-locking circulator to the first input port, (vi) detecting, with a first phase-calibration photodetector, at least a first portion of the sequence of phase-calibration pulses from the first output port, the first-calibration photodetector outputting a first phase-calibration signal, (vii) detecting, with a second phase-calibration photodetector, at least a second portion of the sequence of phase-calibration pulses that are reverse-coupled through the phase-calibration circulator, the second phase-calibration photodetector outputting a second phase-calibration signal, and (viii) controlling, based on the first and second phase-calibration signals, the optical phase shifter such that an optical phase shift between the first and second interferometer arms is similar to a reference phase shift of the sequence of phase-calibration pulses. As one example of these embodiments, FIG. 10 illustrates the use of phase-calibration pulses with two user nodes 1002(1) and 1002(2).

In some embodiments of the first method, said encoding includes modulating the sequence of optical pulses to create a decoy state. In other embodiments, said encoding includes polarization encoding the logical qubit in said each of the optical pulses. Said polarization encoding may include driving a phase modulator. FIG. 9 shows one example of driving a phase modulator to implement polarization encoding.

In other embodiments, a second method for measurement-device-independent quantum key distribution includes splitting the output of a wavelength-calibration laser into first and second wavelength-calibration signals. For example, the splitter 702 of FIG. 7 splits the output 706 of the wavelength-calibration laser 704 into a first wavelength-calibration signal 518(1) and a second wavelength-calibration signal 518(2). The second method also includes transmitting the first wavelength-calibration signal to a first node of the quantum key distribution network, and transmitting the second wavelength-calibration signal to a second node of the quantum key distribution network. For example, the hub 700 transmits the first wavelength-calibration signal 518(1) to the first node 500(1) and the second wavelength-calibration signal 518(2) to the second node 500(2). The second method also includes receiving a first photonic qubit from the first node, and receiving, from the second node, a second photonic qubit synchronously with the first photonic qubit. For example, the hub 700 receives the first photonic qubits 528(1) from the first node 500(1) and the second photonic qubits 528(2) from the second node 500(2). The second method also includes performing a Bell-state measurement with the first and second photonic qubits. For example, the hub 700 includes a Bell-state measurer 710 that performs Bell-state measurements on the photonic qubits 528(1) and 528(2). The second method may include publicly announcing whether or not the Bell-state measurement was successful.

In some embodiments of the second method, said receiving the first photonic qubit includes receiving a first single-photon pulse or a first weakly coherent pulse, and said receiving the second photonic qubit includes receiving a second single-photon pulse or a second weakly coherent pulse. In other embodiments, the second method includes emitting continuous-wave light from the wavelength-calibration laser. In other embodiments, the second method includes modulating the wavelength-calibration laser to create a sequence of wavelength-calibration pulses, each of the wavelength-calibration pulses having a duration longer than that of the first and second photonic qubits.

In some embodiments, the second method further includes splitting, with an asymmetric Mach-Zehnder interferometer, each of the wavelength-calibration pulses into two time bins. FIG. 10 illustrates one example of an asymmetric Mach-Zehnder interferometer splitting each wavelength-calibration pulse into two time bins.

In some embodiments, the second method further includes electronically controlling a synchronization laser to emit a sequence of time-synchronization pulses synchronously with a reference clock. The second method further includes combining, with a wavelength division multiplexer, the sequence of time-synchronization pulses and the output of the wavelength-calibration laser. Said electronically controlling may include modulating a distributed feedback laser. In one example of these embodiments, the driver 808 of FIG. 8 directly modules the synchronization laser 804 to generate the modulated output 814.

In some embodiments of the second method, said measuring the Bell state includes (i) detecting the first and second photonic qubits with at least two single-photon detectors, (ii) processing, with a time-interval analyzer, an output from each of the at least two single-photon detectors, and (iii) triggering each of the at least two single-photon detectors synchronously with the reference clock. Said triggering may include (iv) generating a trigger signal for each of the at least two single-photon detectors, (v) delaying, with a delay generator, each trigger signal to create a delayed trigger signal, and (vi) triggering said each of the at least two single-photon detectors with its delayed trigger signal. FIGS. 9 and 10 illustrate two examples of these embodiments.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A node for a measurement-device-independent quantum key distribution network, comprising:
   a laser diode configured to emit a sequence of optical pulses;
   a qubit encoder configured to encode a logical qubit in each of the optical pulses to create a sequence of photonic qubits;
   an injection-locking circulator configured to forward couple the sequence of optical pulses from the laser diode to the qubit encoder; and
   a calibrator configured to couple a wavelength-calibration signal from a hub of the quantum key distribution network to the injection-locking circulator such that the injection-locking circulator reverse couples the wavelength-calibration signal into the laser diode to injection-lock the laser diode.

2. The node of claim 1, the laser diode comprising a Fabry-Perot laser diode.

3. The node of claim 1, wherein each of photonic qubits is a weakly coherent pulse.

4. The node of claim 1, the calibrator comprising
   a time-delay controller configured to electronically control, based on an electronic timing signal derived from the wavelength-calibration signal, one or both of the laser diode and the qubit encoder such that the sequence of photonic qubits is transmitted synchronously with the electronic timing signal.

5. The node of claim 4, the time-delay controller including a delay generator configured to delay the electronic timing signal into a delayed timing signal, wherein the time-delay controller is configured to electronically control one or both of the laser diode and the qubit encoder based on the delayed timing signal.

6. The node of claim 1, the qubit encoder comprising an asymmetric Mach-Zehnder interferometer, first and second intensity modulators, and a phase modulator that are configured to collectively implement time-bin phase-encoding of the logical qubit in said each of the optical pulses.

7. The node of claim 1, the qubit encoder comprising an intensity modulator configured to generate decoy states.

8. The node of claim 1, the qubit encoder comprising a polarization modulator configured to implement polarization-encoding of the logical qubit in said each of the optical pulses.

9. The node of claim 8, the polarization modulator comprising a circulator, a phase modulator, and a Faraday mirror.

10. The node of claim 4, further comprising:
    a wavelength-division multiplexer configured to separate an optical clock signal from the wavelength-calibration signal; and
    a photodetector configured to convert the optical clock signal into the electronic timing signal.

11. A hub for a measurement-device-independent quantum key distribution network, comprising:
    a wavelength-calibration laser;
    an optical splitter configured to split an output of the wavelength-calibration laser into first and second wavelength-calibration signals;
    a first optical output configured to transmit the first wavelength-calibration signal to a first node of the quantum key distribution network;
    a second optical output configured to transmit the second wavelength-calibration signal to a second node of the quantum key distribution network; and
    a Bell-state measurer configured to perform a Bell-state measurement with first and second photonic qubits received from the first and second nodes, respectively.

12. The hub of claim 11, wherein each of the first and second photonic qubits is a weakly coherent pulse.

13. The hub of claim 11, wherein the output of the wavelength-calibration laser is continuous-wave.

14. The hub of claim 11, wherein the output of the wavelength-calibration laser comprises a sequence of wavelength-calibration pulses, each of the wavelength-calibration pulses having a duration longer than that of the first and second photonic qubits.

15. The hub of claim 14, further comprising an asymmetric Mach-Zehnder interferometer configured to split each of the wavelength-calibration pulses into two time bins.

16. The hub of claim 11, further comprising:
    a synchronization laser configured to emit a sequence of time-synchronization pulses synchronously with a reference clock; and
    a wavelength-division multiplexer configured to combine the sequence of time-synchronization pulses and the output of the wavelength-calibration laser;
    wherein an output of the wavelength-division multiplexer is coupled to an input of the optical splitter.

17. The hub of claim 16, the synchronization laser comprising a distributed feedback laser.

18. The hub of claim 16, the the synchronization laser including a delay generator.

19. The hub of claim 16, the Bell-state measurer including:
    at least two single-photon detectors;
    a time-interval analyzer configured to process an output from each of the at least two single-photon detectors; and
    a photon-detector trigger circuit configured to trigger each of the at least two single-photon detectors synchronously with the reference clock.

20. The hub of claim 19, the photon-detector trigger circuit including a delay generator.

21. The hub of claim 16, further comprising the reference clock.

22. A node for a measurement-device-independent quantum key distribution network, comprising:
    an optical circulator having a first port, a second port, and a third port, the optical circulator being configured to (i) emit, from the second port, light coupled into the first port and (ii) emit, from the third port, light coupled into the first port;
    a qubit encoder configured to encode a logical qubit in each of a sequence of optical pulses emitted from the second port of the optical circulator to create a sequence of photonic qubits; and
    a calibrator configured to couple a wavelength-calibration signal from a hub of the quantum key distribution network into the third port of the optical circulator such that the wavelength-calibration signal is emitted from the first port of the optical circulator.

23. The node of claim 22, wherein each of photonic qubits is a weakly coherent pulse.

24. The node of claim 22, the calibrator comprising a time-delay controller configured to electronically control, based on an electronic timing signal derived from the wavelength-calibration signal, one or both of a laser diode and the qubit encoder such that the sequence of photonic qubits is transmitted synchronously with the electronic timing signal.

25. The node of claim 24, further comprising:
 a wavelength-division multiplexer configured to separate an optical clock signal from the wavelength-calibration signal; and
 a photodetector configured to convert the optical clock signal into the electronic timing signal.

26. The node of claim 24, the time-delay controller including a delay generator configured to delay the electronic timing signal into a delayed timing signal, wherein the time-delay controller is configured to electronically control one or both of the laser diode and the qubit encoder based on the delayed timing signal.

27. The node of claim 22, further comprising a diode laser coupled to the first node of the optical circulator.

* * * * *